United States Patent
Muir et al.

(10) Patent No.: US 10,221,785 B2
(45) Date of Patent: Mar. 5, 2019

(54) CANISTER AND FUEL VAPORS CONTROL SYSTEM FOR VEHICLE

(71) Applicants: DENSO International America, Inc., Southfield, MI (US); DENSO CORPORATION, Kariya, Aichi-pref. (JP)

(72) Inventors: Steven Muir, LaSalle (CA); Paolo Guidi, Armada, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 15/626,217

(22) Filed: Jun. 19, 2017

(65) Prior Publication Data

US 2018/0363574 A1    Dec. 20, 2018

(51) Int. Cl.
F02D 41/00     (2006.01)
F02M 25/08     (2006.01)

(52) U.S. Cl.
CPC ..... F02D 41/0042 (2013.01); F02M 25/0854 (2013.01)

(58) Field of Classification Search
CPC ............... F02M 25/08; F02M 25/0836; F02M 25/0854; F02M 2025/0881
USPC ......... 123/516, 518–520; 701/102, 109, 114, 701/115
See application file for complete search history.

(56) References Cited

U.S. PATENT DOCUMENTS

| | | | | |
|---|---|---|---|---|
| 5,957,113 A | * | 9/1999 | Masaki | F02M 25/089 123/518 |
| 6,478,849 B1 | * | 11/2002 | Taylor | B01D 53/04 95/106 |
| 2007/0227514 A1 | * | 10/2007 | Terada | F02M 25/089 123/519 |
| 2017/0008390 A1 | | 1/2017 | Dubar et al. | |
| 2017/0045007 A1 | | 2/2017 | Pursifull | |

* cited by examiner

*Primary Examiner* — John Kwon
*Assistant Examiner* — Johnny H Hoang

(57) ABSTRACT

The present disclosure provides a canister for a vehicle. The canister includes a body, an adsorbent, and a weight sensing device. The body defines therein a housing space. The adsorbent is housed in the housing space. The adsorbent temporarily traps fuel vapors generated in a fuel tank for the vehicle. The weight sensing device detects a physical quantity associated with weight of the fuel vapors trapped by the adsorbent. The weight sensing device outputs the detected physical quantity.

8 Claims, 4 Drawing Sheets

CANISTER AND FUEL VAPORS CONTROL SYSTEM FOR VEHICLE

TECHNICAL FIELD

The present disclosure relates to a canister and a fuel vapors control system for a vehicle.

BACKGROUND

Vehicle engine systems typically includes a fuel vapors control systems configured to temporarily store fuel vapors in a canister and to purge the stored fuel vapors during engine operation. Purged fuel vapors are supplied into an intake manifold of an internal combustion engine for combustion, which may lead to fuel economy as well as being environmentally friendly.

However, recent regulations impose much stricter request for effective engine performance and less environmental burden from automotive industries, and therefore further improvements on fuel vapor control systems are required.

SUMMARY

This section provides a general summary of the disclosure, and is not a comprehensive disclosure of its full scope or all of its features.

In a first aspect of the present disclosure, a canister includes a body, an adsorbent, and a weight sensing device. The body defines therein a housing space. The adsorbent is housed in the housing space. The adsorbent temporarily traps fuel vapors generated in a fuel tank for the vehicle. The weight sensing device detects a physical quantity associated with weight of the fuel vapors trapped by the adsorbent. The weight sensing device outputs the detected physical quantity.

In a second aspect of the present disclosure, a fuel vapors control system for a vehicle includes a canister, a purge valve, a controller. The canister is fluidly connected to both a fuel tank and an intake manifold for the vehicle. The purge valve is coupled to a purge conduit connecting the canister to the intake manifold. The purge valve selectively opens and closes the purge conduit. The controller is configured to control operation of the purge valve. The canister includes a body, an adsorbent, and a weight sensing device. The body defines a housing space therein. The adsorbent is housed in the housing space and temporarily traps fuel vapors generated in the fuel tank. The weight sensing device detects a physical quantity associated with weight of the fuel vapors trapped by the adsorbent and outputs the detected physical quantity to the controller. The controller controls the operation of the purge valve based on the physical quantity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

DETAILED DESCRIPTION

In the following embodiments, a canister and a fuel vapors control system for a vehicle will be described. It is needless to say that following embodiments are some examples of the present disclosure, and therefore the present disclosure is not limited to these embodiment. Furthermore, each of substantially the same structures among the embodiments will be assigned to the respective common referential numeral and the description of substantially the same structures will be omitted in the subsequent embodiments.

Figure 1:
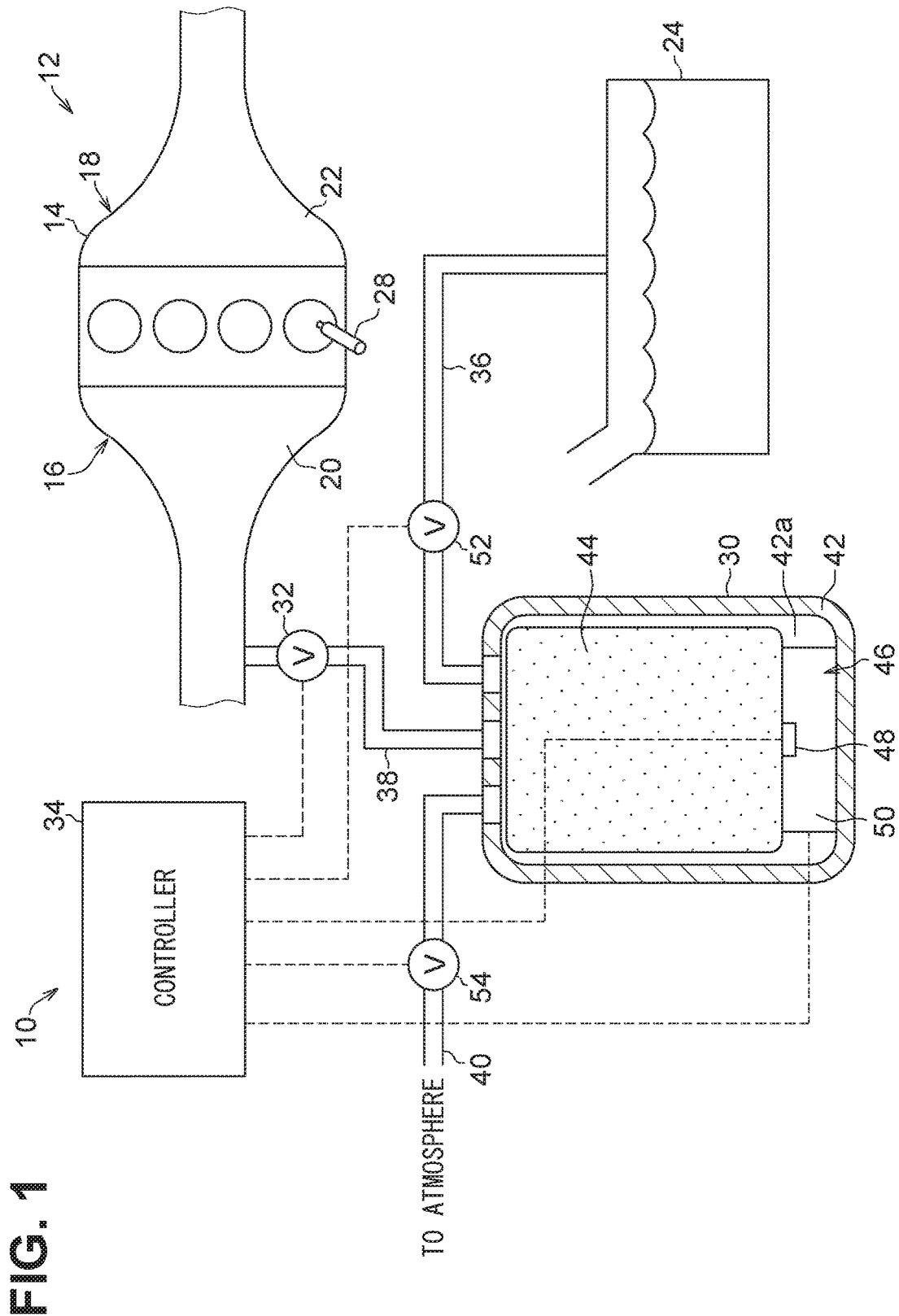
FIG. 1 is a schematic diagram illustrating a fuel vapors control system according to a first embodiment.

FIG. 1 shows a schematic depiction of a fuel vapors control system 10 that is applied to an engine system 12 for a vehicle such as a hybrid vehicle or a non-hybrid vehicle. The engine system 12 includes an internal combustion engine 14 (hereinafter, referred to as an "engine 14") having a plurality of cylinders. The engine 14 includes an engine intake 16 and an engine exhaust 18. The engine intake 16 includes an intake manifold 20 and the engine exhaust 18 includes an exhaust manifold 22.

The engine system 12 further includes a fuel tank 24 coupled to a fuel pump (not shown). The fuel tank 24 stores fuel therein and is fluidly connected to injectors 28 of the engine 14. The fuel pump is configured to pressurize and deliver fuel from the fuel tank 24 to the injectors 28.

The fuel vapors control system 10 according to the present embodiment includes a canister 30, a purge valve 32, and an electronic control unit 34 (or a controller, hereinafter, referred to as an ECU 34). The canister 30 is fluidly connected to the fuel tank 24 through a vapor conduit 36. Fuel vapors generated in the fuel tank 24 are routed to the canister 30 through the vapor conduit 36. The canister 30 is also fluidly connected to the intake manifold 20 through a purge conduit 38. Furthermore, the canister 30 is in fluid communication with the atmosphere (i.e., an outside of the vehicle) through a vent conduit 40.

The canister 30 generally includes a body 42, an adsorbent 44, and a weight sensing device 46. In the present embodiment, a thermocouple 48 (a temperature sensor) is also included in the canister 30. The body 42 is formed in a box shape and defines therein a housing space 42a. The adsorbent 44 is housed in the housing space 42a. The adsorbent 44 may be, e.g., activated charcoal. In the present embodiment, the adsorbent 44 is filled in the housing space 42a except a lower space of the body 42. That is, the housing space 42a is generally divided into two spaces, an upper space for the adsorbent 44 and the lower space. In the lower space, the weight sensing device 46s is disposed and supports the adsorbent 44 from a lower position.

The adsorbent 44 temporarily traps (adsorbs), during a non-purging operation, fuel vapors including vaporized hydrocarbons (HCs) generated in the fuel tank 24. Weight of the adsorbent 44 increases as an amount of the fuel vapors trapped by the adsorbent 44 increases. The fuel vapors trapped by the adsorbent 44 will be released (i.e., purged) from the adsorbent 44 during a purging operation, as will be described below.

The weight sensing device 46 may be any type of weighing scales, such as mechanical scales, digital scales, and so on. More specifically, the weight sensing device 46 may be, for example, a spring scale or a strain gauge scale. In the present embodiment, the weight sensing device 46 is disposed under the adsorbent 44 as described above. The weight sensing device 46 includes a holder 50 having a plate shape. The holder 50 is in contact with the adsorbent 44 and supports the adsorbent 44 against a gravity force of the adsorbent 44. In other words, the holder 50 receives weight of the adsorbent 44.

The weight sensing device 46 in the present embodiment is configured to directly detect weight of the adsorbent 44 received by the holder 50. The weight sensing device 46 may be electrically connected to the ECU 34 and outputs the detected weight of the adsorbent 44 to the ECU 34. Alternatively, the weight sensing device 46 may wirelessly transmit the detected weight to the ECU 34 through wireless transmission technologies. It should be noted that the weight of the adsorbent 44 is a physical quantity directly associated with weight of fuel vapors trapped by the adsorbent 44.

The thermocouple 48 is integrally formed with the weight sensing device 46. For example, the thermocouple 48 is integrally formed with the holder 50 as shown in FIG. 1. The thermocouple 48 is configured to detect a temperature in the housing space 42a, in other words, detect a temperature of fuel vapors captured by the adsorbent 44. The thermocouple 48 may be electrically connected to the ECU 34 and outputs the detected temperature to the ECU 34. Alternatively, the thermocouple 48 may wirelessly transmit the detected temperature to the ECU 34 through wireless transmission technologies.

The purge valve 32 is coupled to the purge conduit 38 and selectively opens and closes the purge conduit 38. Furthermore, the purge valve 32 is configured to be able to adjust opening degree of the purge conduit 38. The purge valve 32 is electrically connected to the ECU 34 and operation of the purge valve 32 is controlled by the ECU 34. Thus, the ECU 34 controls the opening degree of the purge valve 32 during the vapor purging mode according to operating conditions of the engine 14.

A vapor valve 52 is coupled to the vapor conduit 36 and selectively opens and closes the vapor conduit 36. As with the purge valve 32, the vapor valve 52 is electrically connected to the ECU 34 and operation of the vapor valve 52 is controlled by the ECU 34. A vent valve 54 is coupled to the vent conduit 40 and selectively opens and closes the vent conduit 40. The vent valve 54 may constitute a part of an evaporative leak check module (ELCM). The vent valve 54 is electrically connected to the ECU 34 and operation of the vent valve 54 is also controlled by the ECU 34.

The ECU 34 may be formed of a memory and a microprocessor. The memory may include a random access memory (RAM) and read-only memory (ROM) and store programs. The programs in the memory may be computer-readable, computer-executable software code containing instructions that are executed by the microprocessor. That is, the microprocessor carries out functions by performing programs stored in the memory.

More specifically, the ECU 34 may perform at least a vapor storing mode and a vapor purging mode. The vapor storing mode may be performed when the engine 14 is stopped. During the vapor storing mode, the ECU 34 controls the fuel vapors control system 10 to store in the canister 30 fuel vapors generated in the fuel tank 24. More specifically, the ECU 34 controls the vapor valve 52 and the vent valve 54 to open and controls the purge valve 32 to close. As a result, fuel vapors generated in the fuel tank 24 is directed to the canister 30 while preventing fuel vapors from being directed into the intake manifold 20.

The ECU 34 performs the vapor purging mode when the engine 14 is started. During the vapor purging operation, the ECU 34 controls the fuel vapors control system 10 to supply (i.e., purge) fuel vapors in the canister 30 to the intake manifold 20. More specifically, the ECU 34 controls the vapor valve 52 to close and controls the purge valve 32 and the vent valve 54 to open. As a result, fuel vapors in the canister 30 is directed to the intake manifold 20 while preventing fuel vapors in the fuel tank 24 from flowing into the canister 30.

The ECU 34 is configured to estimate an amount of fuel vapors in the canister 30 based on the weight of the adsorbent 44 input from the weight sensing device 46 and the temperature input from the thermocouple 48 during at least the vapor purging mode. Then, the ECU 34 controls opening degree of the purge valve 32 based on the estimated amount of fuel vapors in the canister 30 such that a necessary amount of fuel vapors (HC) can be supplied to the intake manifold 20 according to operating conditions of the engine 14.

Next, operation of the fuel vapors control system 10 will be described below. When the engine 14 is stopped (e.g., fuel refilling is performed for a non-hybrid vehicle or the motor is in operation for a hybrid vehicle), the ECU 34 performs the vapor storing mode. During the vapor storing mode, fuel vapors are allowed to flow into the canister 30, and trapped (adsorbed) by the adsorbent 44 in the canister 30. An amount of the trapped fuel vapors increases as time elapses in the vapor storing mode. Therefore, weight of the adsorbent 44 detected by the weight sensing device 46 increases as an amount of the fuel vapors trapped by the adsorbent 44 increases. During the vapor storing mode, the weight sensing device 46 periodically outputs the detected weight to the ECU 34 at specified intervals.

Furthermore, as fuel vapors are adsorbed by the adsorbent 44, heat is generated in the canister 30 (heat of adsorption). Therefore, the temperature detected by the thermocouple 48 increases during the vapor storing mode as an amount of fuel vapors trapped by the adsorbent 44 increases. The thermocouple 48 periodically outputs the detected temperature to the ECU 34 at specified intervals.

When the engine 14 is started (e.g., an ignition switch is turned on for a non-hybrid vehicle or the engine 14 is in operation for a hybrid vehicle), the ECU 34 performs the vapor purging mode. When the vapor purging mode starts, the ECU 34 estimates an amount of the fuel vapors currently stored in the canister 30 based on the weight most recently input from the weight sensing device 46 and the temperature most recently input from the thermocouple 48. Then, the ECU 34 adjusts opening degree of the purge valve 32 based on the estimated amount of the fuel vapors in the canister 30 such that a necessary amount of fuel vapors can be supplied to the intake manifold 20 according to operating conditions of the vehicle.

Thereafter, the ECU 34 periodically calculates, at specified intervals, an amount of the fuel vapors in the canister 30 based on the updated weight input from the weight sensing device 46 and the updated temperature input from the thermocouple 48. Then, the ECU 34 adjusts the opening degree of the purge valve 32 based on the calculated amount of the fuel vapors in the canister 30 such that an actual amount of fuel vapors supplied to the intake manifold 20 reaches the calculated required amount.

As described above, the weight sensing device 46 directly detects weight of the adsorbent 44 in the canister 30 and the thermocouple 48 detects a temperature in the canister 30. Then, the ECU 34 calculates an amount of the fuel vapors in the canister 30 based on the weight of the adsorbent 44 and the temperature in the canister 30 when the engine 14 is started. Therefore, the ECU 34 can obtain the amount of the fuel vapors in the canister 30 upon starting operation of the engine 14. As a result, the ECU 34 properly controls opening degree of the purge valve 32 based on the calculated amount of the fuel vapors in the canister 30 immediately after the engine 14 was started.

If a HC sensor or an $O_2$ sensor is used to detect or estimate an amount of fuel vapors in the canister 30 as a conventional fuel vapors control system, such a conventional system needs to wait for a certain time to detect or estimate the amount of fuel vapors after the engine 14 was started. For example, a HC sensor is conventionally coupled to the purge conduit 38 to detect fuel vapors (HC) contained in the air flowing through the purge conduit 38. Therefore, the HC sensor can detect an amount of fuel vapors until after an air flows through the purge conduit 38. Similarly, $O_2$ sensors only work when heated to over 300° C. (about 600° F.), and therefore the $O_2$ sensors need to wait for a certain time to estimate fuel vapors (HC) until the engine 14 is heated.

For these reasons, a conventional system using a HC sensor or an $O_2$ sensor cannot start the vapor purging mode immediately after the engine 14 is started. Therefore, the conventional system wastes a certain time after starting the engine 14 until the $O_2$ sensor or the HC sensor detects an amount of the fuel vapors.

Conversely, the fuel vapors control system 10 according to the present embodiment can start the vapor purging mode upon starting the engine 14 as described above. Therefore, a necessary amount of fuel vapors (HC) can be supplied to the intake manifold 20 immediately after the engine 14 was started, whereby engine performance can be improved from the beginning.

In addition, the fuel vapors control system 10 according to the present embodiment calculates an amount of the fuel vapors based on both the weight detected by the weight sensing device 46 and the temperature detected by the thermocouple 48. Therefore, the accuracy of the estimated amount of fuel vapors in the canister 30 can be increased as compared to a situation where the ECU 34 calculates an amount of fuel vapors only using the weight detected by the weight sensing device 46.

It should be noted that the thermocouple 48 may be eliminated in the first embodiment. In this situation, the fuel vapors control system 10 may calculates an amount of fuel vapors in the canister 30 based on only the weight detected by the weight sensing device 46.

Second Embodiment

Figure 2:
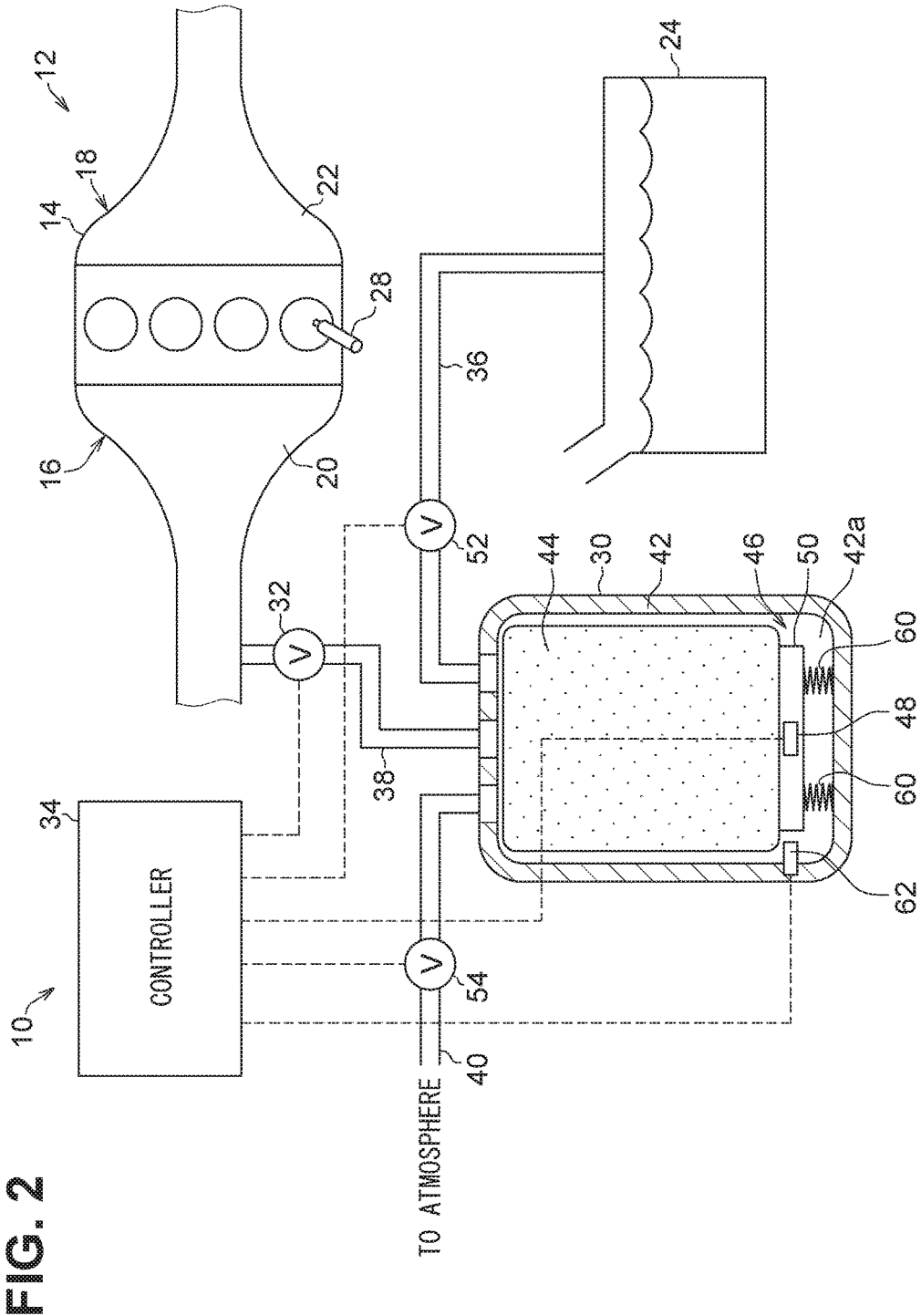
FIG. 2 is a schematic diagram illustrating a fuel vapors control system according to a second embodiment.

FIG. 2 shows a schematic view of a fuel vapors control system 10 according to the second embodiment. In the second embodiment, the weight sensing device 46 has a different structure from the first embodiment. The weight sensing device 46 includes a holder 50, springs 60 (biasing members), and a position sensor 62. The holder 50 is disposed in the lower space of the body 42 and supports the adsorbent 44 against its weight. The holder 50 is connected to the bottom of the body 42 through the springs 60. In the present embodiment, two springs 60 are used to reciprocatably support the holder 50. That is, the springs 60 bias the holder 50 in an upward direction against a gravity force. The springs 60 are configured to be compressed in proportion to weight of the adsorbent 44, and therefore the holder 50 moves downward according to the weight of the adsorbent 44.

In the present embodiment, the position sensor 62 is configured to detect a position of the holder 50. For example, the position sensor 62 may be attached to an inner wall of the body 42 as shown in FIG. 2 and detect a displacement of the holder 50 from the equilibrium position of the holder 50. The equilibrium position is a position of the holder 50 supported by the springs 60 when there is no fuel vapor trapped by the adsorbent 44. Since the position of the holder 50 is a physical quantity associated with weight of fuel vapors trapped by the adsorbent 44, the weight of fuel vapors in the canister 30 can be estimated from the position of the holder 50. The position sensor 62 is electrically connected to the ECU 34 and periodically outputs the detected position of the holder 50 to the ECU 34 at specified intervals.

In the present embodiment, the thermocouple 48 is integrally formed with the holder 50, as with the first embodiment. The thermocouple 48 detects a temperature in the canister 30 and periodically outputs the detected temperature to the ECU 34 at specified intervals.

The ECU 34 is configured to estimate an amount of fuel vapors in the canister 30 based on the position of the holder 50 input from the position sensor 62 and the temperature in the canister 30 input from the thermocouple 48. Since the ECU 34 obtains the position of the holder 50 and the temperature in the canister 30 during the vapor storing mode, the ECU 34 can estimate an amount of fuel vapors in the canister 30 upon starting the engine 14. Therefore, the fuel vapors control system 10 according to the second embodiment can obtain similar advantages as described in the first embodiment.

It should be noted that the position sensor 62 in the second embodiment is configured to detect a position of the holder 50. Alternatively, the position sensor 62 may be configured to detect a position of the adsorbent 44. The position of the adsorbent 44 is a physical quantity associated with weight of fuel vapors trapped by the adsorbent 44. Therefore, the ECU 34 may estimate an amount of fuel vapors in the canister 30 based on the position of the adsorbent 44 detected by the position sensor 62.

Third Embodiment

Figure 3:
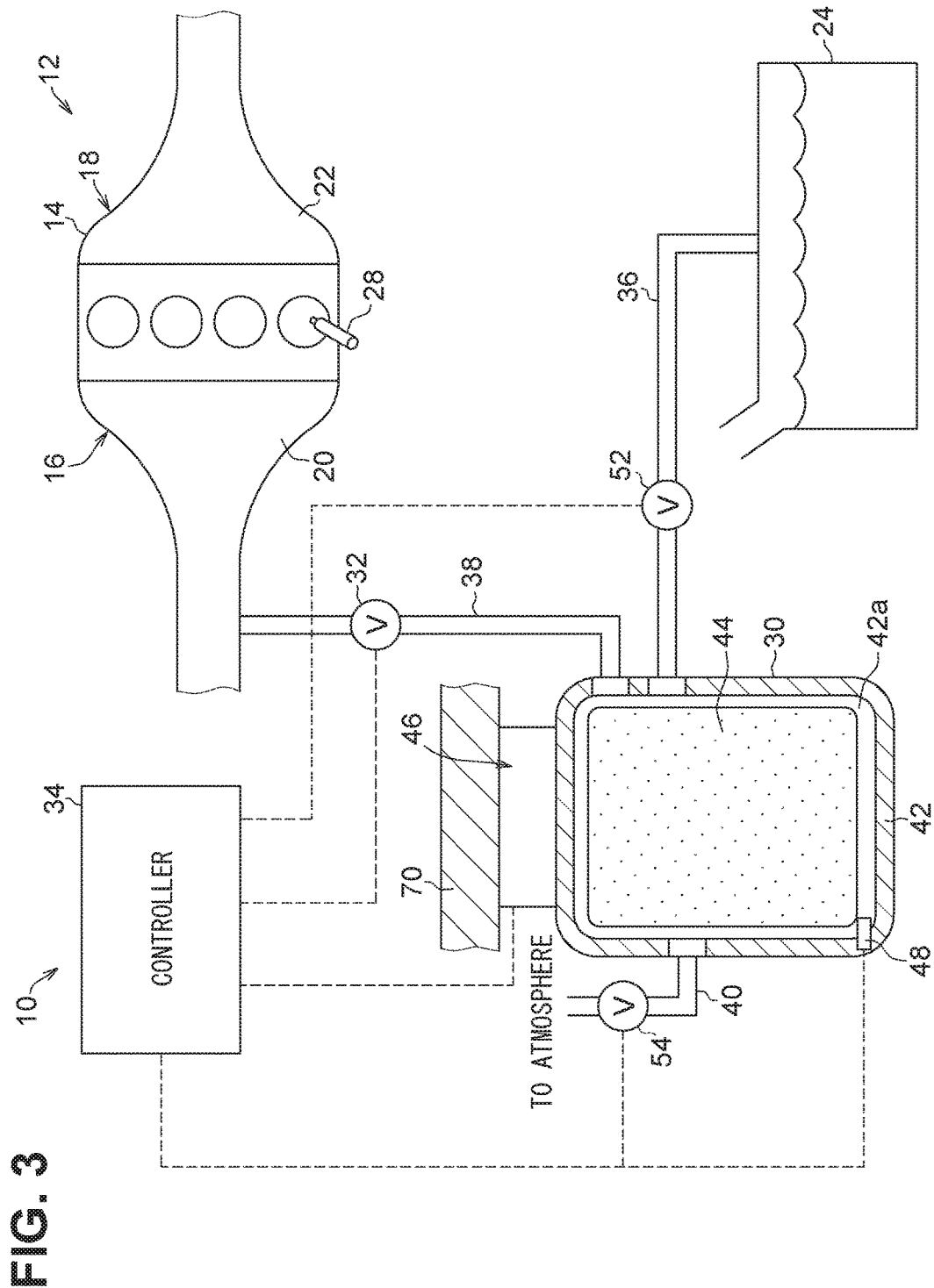
FIG. 3 is a schematic diagram illustrating a fuel vapors control system according to a third embodiment.

FIG. 3 shows a schematic view of a fuel vapors control system 10 according to the third embodiment. In the third embodiment, the canister 30 includes the weight sensing device 46 that is disposed outside of the body 42 as shown in FIG. 3. The upper side of the weight sensing device 46 is fixed to a vehicle body 70 (e.g., a frame in the engine compartment of the vehicle). The lower side of the weight sensing device 46 is attached to a top surface of the body 42. In other words, the body 42 is suspended by the weight sensing device 46.

The weight sensing device 46 according to the third embodiment can be any type of weighing scales, such as mechanical scales, digital scales, and so on. The weight sensing device 46 is configured to directly detect weight of the body 42 including the adsorbent 44. The weight sensing device 46 is electrically connected to the ECU 34 and periodically outputs the detected weight of the body 42 to the ECU 34 at specified intervals.

During the vapor storing mode, weight of the body 42 increases as weight of fuel vapors trapped by the adsorbent 44 increases. Therefore, the weight of the body 42 detected by the weight sensing device 46 is a physical quantity associated with weight of fuel vapors trapped by the adsorbent 44.

In the present embodiment, the thermocouple 48 is disposed in the body 42 and detects a temperature in the body 42. The thermocouple 48 is electrically connected to the ECU 34 and periodically outputs the detected temperature to the ECU 34 at specified intervals.

The ECU 34 estimates an amount of fuel vapors contained in the body 42 based on the weight of the body 42 input from the weight sensing device 46 and the temperature in the body 42 input from the thermocouple 48. More specifically, the ECU 34 stores in the memory total weight of the body 42 in advance. The total weight is weight of the body 42 including the adsorbent 44 and the thermocouple 48 in a state where no fuel vapor is trapped by the adsorbent 44. Then, the ECU 34 calculates weight of the fuel vapors trapped by the adsorbent 44 by subtracting the total weight of the body 42 from the weight input from the weight sensing device 46. Thus, the ECU 34 estimates an amount of the fuel vapors in the body 42 based on the calculated weight of the fuel vapors together with the temperature input from the thermocouple 48.

As with the first and second embodiments, the ECU 34 can estimate an amount of fuel vapors in the canister 30 immediately after the engine 14 is started. Therefore, the fuel vapors control system 10 of the third embodiment can properly adjust opening degree of the purge valve 32 upon starting the engine 14. Thus, similar advantages as described in the first and second embodiments can be obtained in the present embodiment. It should be noted that, although the ECU 34 estimates an amount of the fuel vapors based on both the weight of the body 42 and the temperature in the body 42, the ECU 34 may estimate an amount of the fuel vapors in the canister 30 based on only the weight of the body 42 input from the weight sensing device 46.

Fourth Embodiment

Figure 4:
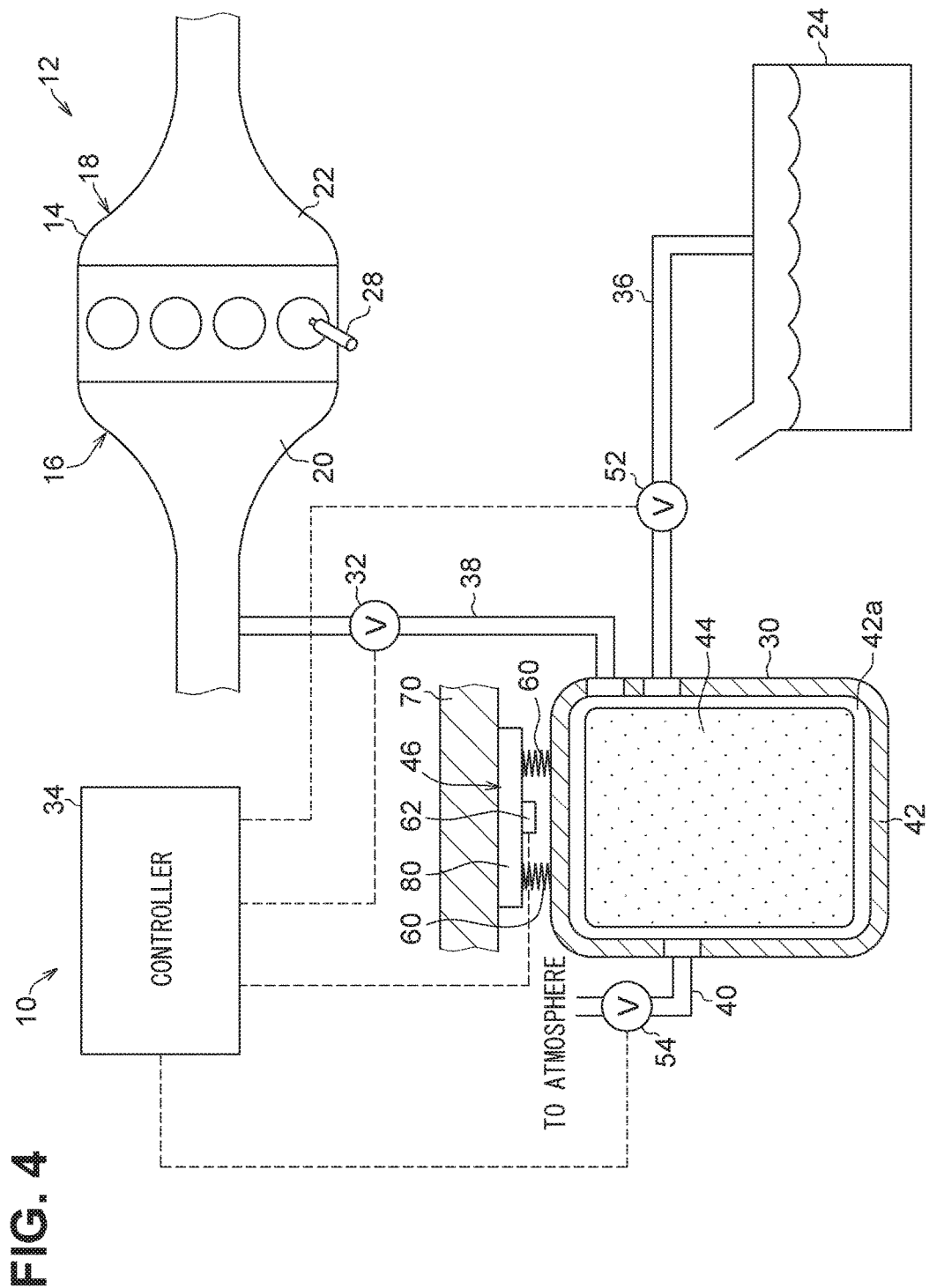
FIG. 4 is a schematic diagram illustrating a fuel vapors control system according to a fourth embodiment.

FIG. 4 shows a schematic view of a fuel vapors control system 10 according to the fourth embodiment. In the fourth embodiment, the weight sensing device 46 has a different structure from the third embodiment. In the present embodiment, the weight sensing device 46 includes a base 80, two springs 60 (biasing members), and a position sensor 62. The upper side of the base 80 is fixed to the vehicle body 70 (e.g., a frame in the engine compartment of the vehicle).

The two springs 60 are attached to the lower side of the base 80. More specifically, one side of each of the two springs 60 is attached to the lower side of the base 80 and the other side of each of the two springs 60 is attached to the top surface of the body 42 of the canister 30. The springs 60 bias the body 42 against a gravity force (i.e., an upward direction). Thus, the body 42 is suspended by the base 80 through the springs 60.

The body 42 is movably suspended by the springs 60. Therefore, the body 42 moves downward as weight of the body 42 increases (i.e., as weight of the adsorbent 44 increases). The position sensor 62 may be attached to the lower side of the base 80. The position sensor 62 is configured to detect a position of the body 42. The position sensor 62 is electrically connected to the ECU 34 and periodically outputs the detected position to the ECU 34 at specified intervals.

As the position of the canister 30 varies in proportion to weight of the body 42, i.e., weight of fuel vapors trapped by the adsorbent 44, the position of the canister 30 is a physical quantity associated with weigh of the trapped fuel vapors. In the present embodiment, the thermocouple 48 to detect a temperature in the canister 30 is not used.

The ECU 34 estimates an amount of fuel vapors in the body 42 based on the position of the body 42 input from the position sensor 62. More specifically, the ECU 34 first calculates weight of the body 42 based on the position input from the position sensor 62. The ECU 34 in advance stores in the memory total weight of the body 42. The total weight is weight of the body 42 including the adsorbent 44 in a state where no fuel vapor is trapped by the adsorbent 44. Then, the ECU 34 calculates weight of the fuel vapors trapped by the adsorbent 44 by subtracting the total weight from the weight of the body 42 calculated from the position of the body 42. Thus, the ECU 34 can estimate an amount of the fuel vapors in the body 42 based on the calculated weight of the fuel vapors.

As with the third embodiment, the ECU 34 can estimate an amount of fuel vapors in the canister 30 immediately after (or even before) the engine 14 is started. Therefore, the fuel vapors control system 10 of the fourth embodiment can properly adjust opening degree of the purge valve 32 upon starting the engine 14. Thus, similar advantages as described in the first to third embodiments can be obtained in the present embodiment.

Other Embodiments

In the above-described embodiments, the thermocouple 48 disposed in the body 42 is used to detect a temperature in the canister 30. Alternatively, another temperature sensor disposed outside of the body 42 may be used to directly or indirectly detect a temperature in the canister 30 (fuel vapors). For example, an intake air temperature disposed in the intake manifold 20 may be used to detect a temperature of fuel vapors flowing through the intake manifold 20. Furthermore, a coolant temperature sensor may be also used to estimate a temperature of fuel vapors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A canister for a vehicle, comprising:
a body that defines therein a housing space;
an adsorbent that is housed in the housing space, the adsorbent temporarily trapping fuel vapors generated in a fuel tank for the vehicle; and
a weight sensing device that detects a physical quantity associated with weight of the fuel vapors trapped by the adsorbent, the weight sensing device outputting the detected physical quantity, wherein
the weight sensing device is disposed in the housing space and includes a holder, a biasing member, and a position sensor,
the holder is disposed under the adsorbent to support the adsorbent and configured to be moveable in accordance with the weight of the adsorbent,
the biasing member biases the holder against a gravity force,
the position sensor detects a position of the holder or the adsorbent as the physical value, and
the weight of the adsorbent is calculated based on the position detected by the position sensor.

2. The canister according to claim 1, further comprising
a temperature sensing device that is disposed in the housing space to detect a temperature in the housing space.

3. The canister according to claim 2, wherein
the temperature sensing device is integrally formed with the weight sensing device.

4. A canister for a vehicle, comprising:
a body that defines therein a housing space;
an adsorbent that is housed in the housing space, the adsorbent temporarily trapping fuel vapors generated in a fuel tank for the vehicle; and
a weight sensing device that detects a physical quantity associated with weight of the fuel vapors trapped by the adsorbent, the weight sensing device outputting the detected physical quantity, wherein
the weight sensing device is fixed to a vehicle body for the vehicle,
the body is suspended by the weight sensing device,
the weight sensing device directly detects the weight of the body including the adsorbent as the physical quantity, and
the weight of the adsorbent is calculated based on the weight detected by the weight sensing device, wherein
the weight sensing device includes a base, a biasing member, and a position sensor,
the base is fixed to the vehicle body,
the body is connected to the base through the biasing member that biases the body against a gravity force,
the position sensor detects a position of the body as the physical quantity, and
the weight of the adsorbent is calculated based on the position detected by the position sensor.

5. A fuel vapors control system for a vehicle, comprising:
a canister that is fluidly connected to both a fuel tank and an intake manifold for the vehicle,
a purge valve that is coupled to a purge conduit connecting the canister to the intake manifold, the purge valve selectively opening and closing the purge conduit; and
a controller that is configured to control operation of the purge valve, wherein the canister includes a body, an adsorbent, and a weight sensing device,
the body defines a housing space therein,
the adsorbent is housed in the housing space and temporarily traps fuel vapors generated in the fuel tank,
the weight sensing device detects a physical quantity associated with weight of the fuel vapors trapped by the adsorbent and outputs the detected physical quantity to the controller, and
the controller controls the operation of the purge valve based on the physical quantity, wherein
the weight sensing device is disposed in the housing space and includes a holder, a biasing member, and a position sensor,
the holder is disposed under the adsorbent to support the adsorbent and configured to be moveable in accordance with the weight of the adsorbent,
the biasing member biases the holder against a gravity force,
the position sensor detects a position of the holder or the adsorbent as the physical value, and
the controller calculates the weight of the adsorbent based on the position detected by the position sensor.

6. The fuel vapors control system according to claim 5, further comprising
a temperature sensing device that is disposed in the housing space to detect a temperature in the housing space and outputs the detected temperature to the controller.

7. The fuel vapors control system according to claim 6,
the temperature sensing device is integrally formed with the weight sensing device.

8. A fuel vapors control system for a vehicle, comprising:
a canister that is fluidly connected to both a fuel tank and an intake manifold for the vehicle,
a purge valve that is coupled to a purge conduit connecting the canister to the intake manifold, the purge valve selectively opening and closing the purge conduit; and
a controller that is configured to control operation of the purge valve, wherein
the canister includes a body, an adsorbent, and a weight sensing device,
the body defines a housing space therein,
the adsorbent is housed in the housing space and temporarily traps fuel vapors generated in the fuel tank,
the weight sensing device detects a physical quantity associated with weight of the fuel vapors trapped by the adsorbent and outputs the detected physical quantity to the controller, and
the controller controls the operation of the purge valve based on the physical quantity, wherein
the weight sensing device is fixed to a vehicle body for the vehicle, and the body is suspended by the weight sensing device,
the weight sensing device directly detects the weight of the body including the adsorbent as the physical quantity, and
the controller calculates the weight of the adsorbent based on the weight detected by the weight sensing device, wherein the weight sensing device includes a base, a biasing member, and a position sensor, the base is fixed to the vehicle body, the body is connected to the base through the biasing member that biases the body against a gravity force, the position sensor detects a position of the body as the physical quantity, and the controller calculates the weight of the adsorbent based on the position detected by the position sensor.

* * * * *